Aug. 27, 1935.  H. FINK ET AL  2,012,382
MANUFACTURE OF SILK FIBROIN SOLUBLE IN WATER
Filed July 6, 1931  2 Sheets-Sheet 1
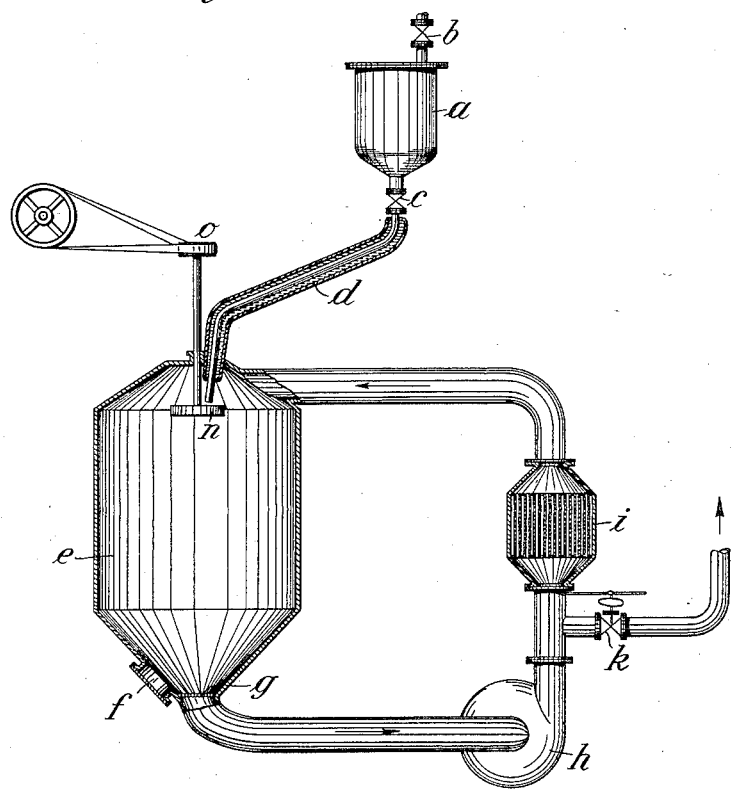

Aug. 27, 1935.  H. FINK ET AL  2,012,382
MANUFACTURE OF SILK FIBROIN SOLUBLE IN WATER
Filed July 6, 1931  2 Sheets-Sheet 2
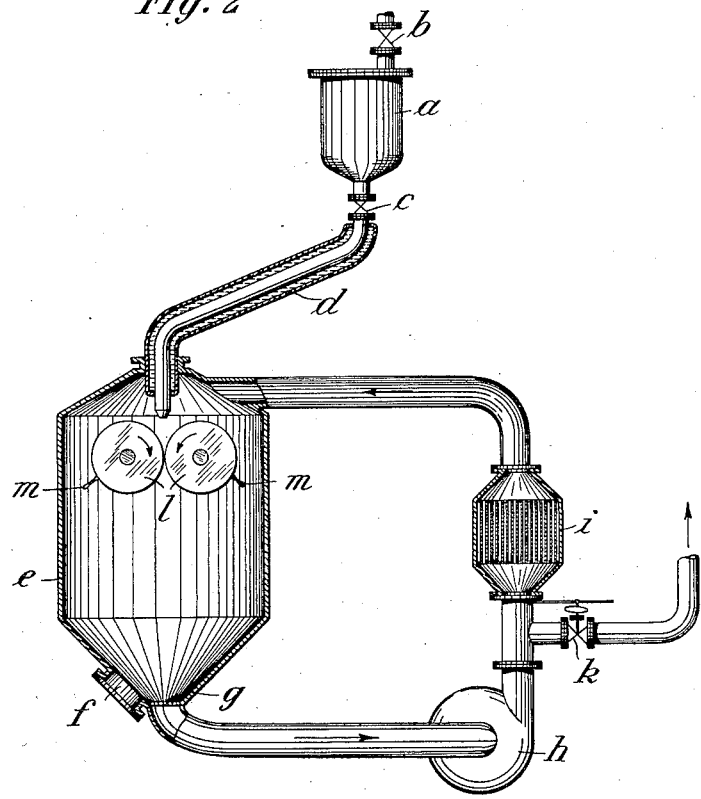

Patented Aug. 27, 1935

2,012,382

UNITED STATES PATENT OFFICE 2,012,382

MANUFACTURE OF SILK FIBROIN SOLUBLE IN WATER

Heinrich Fink and Ernst Rossner, Premnitz/Westhavelland, Germany, assignors to I. G. Farbenindustrie Aktiengesellschaft, Frankfort-on-the-Main, Germany Application July 6, 1931, Serial No. 548,048
In Germany December 23, 1930

8 Claims. (Cl. 260—9)

Our present invention relates to the production of fibroin in dry solid form, said fibroin being easily soluble in water.

One of its objects is a process allowing to transform genuine fibroin as contained for instance in the natural silk and produced by the silkworm of *Bombyx mori* into a solid water soluble product.

An additional object of our invention is the dry water soluble fibroin.

Further objects of our invention relating more particularly to preferred methods of preparing the solid water soluble fibroin will be seen from the detailed specification following hereafter.

We have found that fibroin may be dissolved in liquid anhydrous ammonia at a low temperature and that a water soluble solid fibroin is obtainable from this solution by evaporation of the solvent i. e. the liquid ammonia. In this manner a dry body is obtainable which is practically free from ammonia.

As a starting material we may use the waste of natural silk produced by the mulberry silkworm, *Bombyx mori*, in form of breeding or faulty cocoons, or the outerfloss of the cocoon degummed or not degummed, or the comber of other waste left in the silk industry.

In order to evaporate the liquid ammonia we may work at a raised temperature without detrimentally influencing the solubility in water and without causing a degradation of the fibroin molecule.

This is the more surprising because, as is disclosed in the co-pending application Ser. No. 498,198, filed November 25, 1930, by ourselves and two others that ammonia amounting to a multiple of the weight of the fibroin has to be used for dissolving the native fibroin, and the fibroin smoothly dissolves in ammonia only at a temperature considerably below —40° C.

The solubility in water of the dry fibroin obtained according to the invention depends to some extent upon the fineness of its dispersion. Therefore, the filtered solution of fibroin in anhydrous ammonia is preferably evaporated in the form of thin layers on a heated base, or it is sprayed in known manner whereby the fibroin is obtained in the form of a loose powder or of flakes or fibers, according to the kind of spraying apparatus employed.

The ammonia may be evaporated in a vacuum or by a current of gas. There may be used a temperature of +40° C. and higher without detrimentally influencing the solubility in water of the dry fibroin. When supplying the heat required for the evaporation by means of a current of gas, there is preferably used as carrier of the heat part of the evaporated ammonia itself which is continuously reconducted through a heating device to the apparatus, whereas the main quantity of the evaporated ammonia is delivered through a relief valve to the recovery plant, for instance a compressor. This process, therefore, does not involve any loss of ammonia, and the ammonia must not be separated from water or gases.

The following example serves to illustrate the manner in which the invention may be carried into effect, it being understood that this is given by way of illustration only and can be varied within wide limits, reference being made to the accompanying drawings in which Figs. 1 and 2 represent a sectional view of devices for carrying out our process.

In this example the parts are given by weight.

10 parts of undegummed wastes of mulberry silk are degummed by boiling the same four times for 1½ hours with a solution of olive oil soap of 1% strength; then the wastes are thoroughly freed from soap and boiled for 15 minutes in dilute acetic acid of 3% strength. The starting material thus pretreated and subsequently dried is introduced into 7 times its weight of liquid ammonia the latter being cooled to a temperature of —77° C. While stirring the fibroin dissolved in the ammonia, and the solution is filtered through a fine meshed nickel gauze.

In order to produce the dry fibroin the liquid ammoniacal solution is further worked up for instance in an apparatus as shown in Fig. 1.

The fibroin solution contained in the stock vessel $a$ provided with a valve $b$ flows through the valve $c$ and the tube $d$, the latter being provided with a cooling device, with a speed of 0.2 liter per minute upon a rotating disc $n$. The disc $n$ arranged in the vessel $e$ is provided with a driving means $o$ and is rotated with about 3000 revolutions per minute. Thus the fibroin solution is atomized to form a very fine fog. At the cover of the vessel $e$ a current of gaseous ammonia warmed to about 50° C. is introduced which immediately brings the liquid ammonia contained in the fog to evaporation, so that the fibroin is separated in form of very fine flakes. The fibroin is collected in the lower conus of the vessel $e$ upon a filter $g$ which prevents it from being carried away by the current of ammonia. The latter leaves the vessel $e$ at its bottom, sucked by the ventilator $h$ and is reintroduced into the vessel after having been heated again by a laminated heating device. A relief valve $k$ is branched off from the tubing through which the current of ammonia is guided; this valve leads to the recovery plant for the ammonia evaporated from the fibroin solution.

After having atomized the whole amount of the fibroin ammonia solution the dry fibroin obtained in form of fine flakes may be removed through the opening $f$ capable of being closed by a show window. After having been kept for a longer time at the fresh air the product contains only about 1% of ammonia and about 9% of water. 90-95% of the compound thus obtained are soluble in water.

With a device as shown in Fig. 2 the solid fibroin is obtainable in form of thin leaves. In this case the liquid ammoniacal fibroin solution is applied on two rollers $l$. These rollers are heated to a suitable temperature for instance 40° C. or higher. By means of the scraper $m$ the dry layers formed on the rollers are removed from them and collected in the lower conus in the manner already described. In this case likewise, the evaporated ammonia may be carried away by a current of an inert gas, which may be warmed. After having been freed from the ammonia taken up during the drying operation and after having been rewarmed, if necessary, this inert gas may be reintroduced into the vessel $e$.

The dry fibroin thus obtained retains, when stored in a dry place, its solubility in water, although its content of ammonia amounts only, for instance, to about 1 per cent. It practically completely dissolves in water; the solutions are well suited for being further worked up, for instance, into artificial filaments.

Obviously our invention is not limited to the foregoing example or to the details given therein. Thus, we may use, for instance, as a starting material an ammoniacal solution containing fibroin recovered from a known solution in strong mineral acids or in salt solutions. The waste of solid regenerated fibroin obtained when working up the aqueous solutions of fibroin prepared according to the process described in the copending application Serial Number 499,839, filed on December 3, 1930 by Fink and Rossner, likewise may be used. All these possibilities are considered to be within the spirit of the invention and the scope of the claims following hereafter.

Furthermore the ammonia may be removed from the solution by applying a vacuum. In this case the container in which the evaporation takes place is preferably heated for instance to a temperature of about 30°-50° C. The evaporated ammonia is conducted to a recovery plant.

Instead of employing ammonia as a carrier of the heat for evaporating the ammonia from the anhydrous ammoniacal fibroin solution, another inert gas may be used, such as nitrogen or hydrogen.

The process of dissolving fibroin in liquid ammonia at a low temperature is the subject matter of the copending application Serial Number 498,198, filed on November 25th, 1930 by Gajewski, Fink, Rossner, Mahn and is not claimed in the present application.

What we claim is:

1. A process of producing water-soluble fibroin which comprises bringing an anhydrous ammoniacal solution of fibroin into a fine state of dispersion and evaporating the ammonia until a solid substance is formed.

2. A process of producing water-soluble fibroin which comprises bringing an anhydrous ammoniacal solution of fibroin as contained in natural silk into a fine state of dispersion and evaporating the ammonia until a solid substance is formed.

3. A process of producing water-soluble fibroin which comprises bringing an anhydrous ammoniacal solution of fibroin as contained in natural silk into a fine state of dispersion and evaporating the ammonia contained in the finely dispersed solution by warming.

4. A process of producing water-soluble fibroin which comprises bringing an anhydrous, ammoniacal solution of fibroin as contained in natural silk into a fine state of dispersion and evaporating the ammonia contained in the finely dispersed solution by introducing a warmed current of an inert gas.

5. A process of producing water-soluble fibroin which comprises bringing an anhydrous ammoniacal solution of fibroin as contained in natural silk into a fine state of dispersion and evaporating the ammonia contained in the finely dispersed solution by a warmed circulating current of gaseous ammonia.

6. A process of producing water-soluble fibroin which comprises bringing an anhydrous ammoniacal solution of fibroin as contained in natural silk into a fine state of dispersion and evaporating the ammonia contained in the finely dispersed solution by a circulating current of gaseous ammonia heated to about 50° C.

7. As a new article a water soluble solid fibroin contained at most 1 per cent of ammonia.

8. As a new article a water-soluble solid fibroin containing at most 1 per cent of ammonia in a finely subdivided condition.

HEINRICH FINK.
ERNST ROSSNER.